United States Patent
Jang

(10) Patent No.: US 9,982,772 B2
(45) Date of Patent: May 29, 2018

(54) SHIFTING APPARATUS FOR VEHICLE

(71) Applicant: Hyundai Motor Company, Seoul (KR)

(72) Inventor: Sung Hwan Jang, Hwaseong-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days. days.

(21) Appl. No.: 15/331,198

(22) Filed: Oct. 21, 2016

(65) Prior Publication Data

US 2017/0335958 A1 Nov. 23, 2017

(30) Foreign Application Priority Data

May 20, 2016 (KR) .................. 10-2016-0061897

(51) Int. Cl.
*F16H 61/18* (2006.01)
*F16H 59/44* (2006.01)
*F16H 59/66* (2006.01)

(52) U.S. Cl.
CPC ............. *F16H 59/44* (2013.01); *F16H 61/18* (2013.01); *F16H 2059/663* (2013.01); *F16H 2061/185* (2013.01)

(58) Field of Classification Search
None
See application file for complete search history.

(56) References Cited

U.S. PATENT DOCUMENTS 6,220,986 B1 * 4/2001 Aruga ................. F16H 61/0213
477/97
2009/0018732 A1 * 1/2009 Choby .................... F16H 59/66
701/51
2012/0310497 A1 * 12/2012 Haneda ............... F16H 61/0213
701/52
2014/0067211 A1 * 3/2014 Kim .................... B60W 30/143
701/54
2014/0229081 A1 * 8/2014 Iwase ..................... F16H 59/66
701/51

(Continued)

FOREIGN PATENT DOCUMENTS

EP          1591696 A1   11/2005
JP       H05-178166 A    7/1993
JP      2001-289317 A   10/2001

(Continued)

OTHER PUBLICATIONS

Korean Office Action dated Jun. 20, 2017 form the corresponding Korean Application No. 10-2016-0061897, 5 pp.

*Primary Examiner* — Justin Holmes
(74) *Attorney, Agent, or Firm* — Brinks Gilson & Lione

(57) ABSTRACT

The present disclosure relates to a shifting apparatus for a vehicle which includes a transmission realizing series of multi shift stages so that shift stages are sequentially increased as shift ratios are decreased. The shifting apparatus may include a shift limit means designating a lowest shift stage having a largest shift ratio to a shift stage for climbing and limiting so that a driver may select the shift stage for climbing in an only case that the vehicle satisfies a predetermined climbing condition; a gradient angle sensor for measuring a climb gradient of the vehicle; a vehicle speed sensor for measuring a vehicle speed; and a controller determining the climbing condition based on signals of the gradient angle sensor and the vehicle speed sensor so as to control the shift limit means.

4 Claims, 5 Drawing Sheets

(56) References Cited

U.S. PATENT DOCUMENTS

2015/0149064 A1* 5/2015 Lim .................. B60K 23/0808
   701/110
2017/0045137 A1* 2/2017 Dufford ............. F16H 61/0213

FOREIGN PATENT DOCUMENTS

| KR | 20-1998-0015179   | 6/1998 |
| KR | 20-1998-0020024 U | 7/1998 |
| KR | 10-0887848 B1     | 3/2009 |

* cited by examiner

SHIFTING APPARATUS FOR VEHICLE

CROSS REFERENCE TO RELATED APPLICATION

The present application claims priority to and the benefit of Korean Patent Application No. 10-2016-0061897, filed on May 20, 2016, the entire contents of which are incorporated herein by reference.

FIELD

The present disclosure relates to a shifting apparatus to be mounted to a vehicle.

BACKGROUND

The statements in this section merely provide background information related to the present disclosure and may not constitute prior art.

As shown in FIG. 1 representing a shift stage for each vehicle speed of Europe authorization mode with respect to a vehicle in which a manual transmission is mounted, in EUDC (Extra Urban Driving Cycle), a 6-speed shift stage can be used on an extremely short section when a vehicle speed is equal to or more than 100 kph.

Meanwhile, a trend of recent power trains for vehicles is to pursue downsizing of an engine and multi-stages of a transmission for improving a fuel efficiency.

We have discovered that a set shift stage for each vehicle speed by regulation of Europe authorization mode (New European Driving Cycle: NEDC) for the trend may be not corresponded to a shift stage for each vehicle speed which is actually used in a vehicle, thus, it may be difficult to satisfy amount of exhaust hazardous materials (Emission) and fuel efficiency condition required by the authorization mode.

For instance, FIG. 2 illustrates to compare relations between fuel efficiency and various shift ratio spans with respect to shift ratio spans of a 5-speed transmission according to Europe authorization mode, and in comparison to A, which is to be a standard at a most upper side, representing shift ratio spans of the 5-speed transmission according to Europe authorization mode, for realizing 6-speed shift stages, fuel efficiency may be relatively deteriorated in B, which is positioned immediately below, that a shift ratio section to be same to entire shift ratio span of the A is separated to 6-speed shift stages, and fuel efficiency may be provided to be same to the A in C, which is positioned next below, that 6-speed shift stages are realized such that both a low speed section and a high speed section are extended more than entire shift ratio span of the A by making each shift ratio span to be equal to the standard A, and fuel efficiency may be relatively deteriorated in D, which is positioned next below, that each shift ratio span is extended as the C, however, the high speed section is same to the A and the low speed section is more extended, and fuel efficiency may be better improved in E that each shift ratio span is extended as the C, however, the low speed section is same to the A and the high speed section is more extended.

That is, when 6 stages manual transmission as an example of transmission multi-stages for enhancement of fuel efficiency is configured, in comparison with fuel efficiency according to Europe authorization mode as the A in FIG. 2, fuel efficiency is to be substantially enhanced in case that shift ratio of only 6-stage which is a highest stage is set to be relatively low as the E and fuel efficiency performance is to be same to or less than the A in other case.

As explained above, enhancement of fuel efficiency through reduction of shift ratio and multi-stages (more than 6 speeds) in a vehicle applying a manual transmission is extremely limitative on a condition of Europe authorization mode.

The foregoing is intended merely to aid in the understanding of the background of the present disclosure, and is not intended to mean that the present disclosure falls within the purview of the related art that is already known to those skilled in the art.

SUMMARY

The present disclosure proposes a shifting apparatus for a vehicle of easily realizing to enhance fuel efficiency according to Europe authorization mode and to obtain authorization by this as effect of improving fuel efficiency by reduction of shift ratio and multi-stages in a vehicle applying a manual transmission is substantially actualized with respect to Europe authorization mode, and furthermore easily providing improved grade ability by engine downsizing.

The shifting apparatus for a vehicle according to the present disclosure may include a transmission realizing series of multi shift stages so that shift stages are sequentially increased as shift ratios are decreased, and the shifting apparatus may include: a shift limit means designating a lowest shift stage having a largest shift ratio to a shift stage for climbing and limiting so that it is possible for a driver to select the shift stage for climbing in an only case that a vehicle satisfies a predetermined climbing condition; a gradient angle sensor for measuring a climb gradient of a vehicle; a vehicle speed sensor for measuring a vehicle speed; and a controller determining the climbing condition based on signals of the gradient angle sensor and the vehicle speed sensor so as to control the shift limit means.

The shift limit means may be a solenoid actuator installed so as to block or release a route that a shift lever enters the shift stage for climbing of shift lever patterns which are moving routes of the shift lever.

The controller may be configured to control the solenoid actuator for limiting that the shift lever selects the shift stage for climbing in case that the vehicle speed being inputted from the vehicle speed sensor is same to or less than a predetermined standard vehicle speed and the climb gradient of the vehicle being inputted from the gradient angle sensor is same to or more than a predetermined standard angle.

The series of shift stages of the transmission except the shift stage for climbing sequentially may form 1-stage to N-stage from a shift stage having a shift ratio to be closest to the shift stage for climbing, and the N-stage may mean a highest shift stage having a smallest shift ratio among the shift stages.

A shift ratio span of each shift stages forming the 1-stage to the N-stage may be equal to shift ratio span of a manual transmission according to Europe authorization mode.

A shift ratio of the shift stage for climbing may be predetermined to be larger than a shift ratio of a 1-speed shift stage which is a lowest shift stage of shift stages according to Europe authorization mode.

The present disclosure may easily realize enhancing fuel efficiency according to Europe authorization mode and obtaining authorization by this as effect of improving fuel efficiency by reduction of shift ratio and multi-stages in a vehicle to which a manual transmission is mounted can be substantially materialized with respect to Europe authorization mode, and furthermore providing an improved grade ability by engine downsizing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
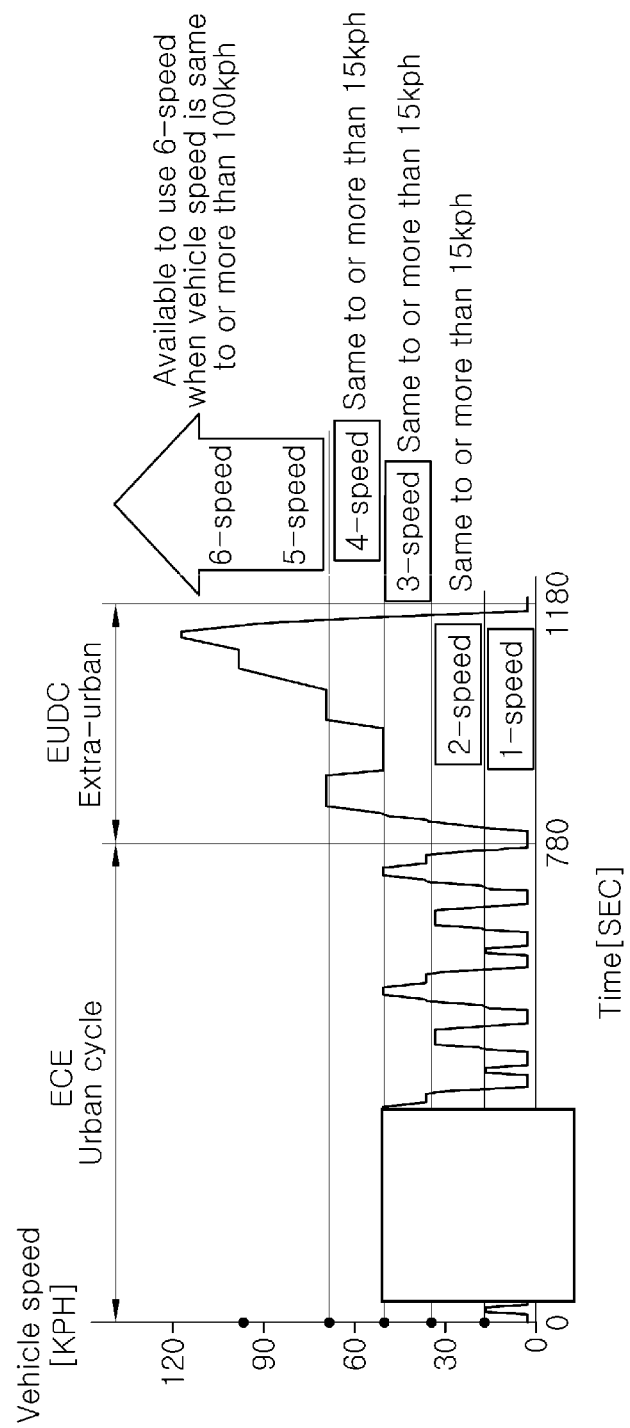
FIG. 1 is a drawing which represents shift stage for each vehicle speed of Europe authorization mode for a vehicle applying a manual transmission.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 3:
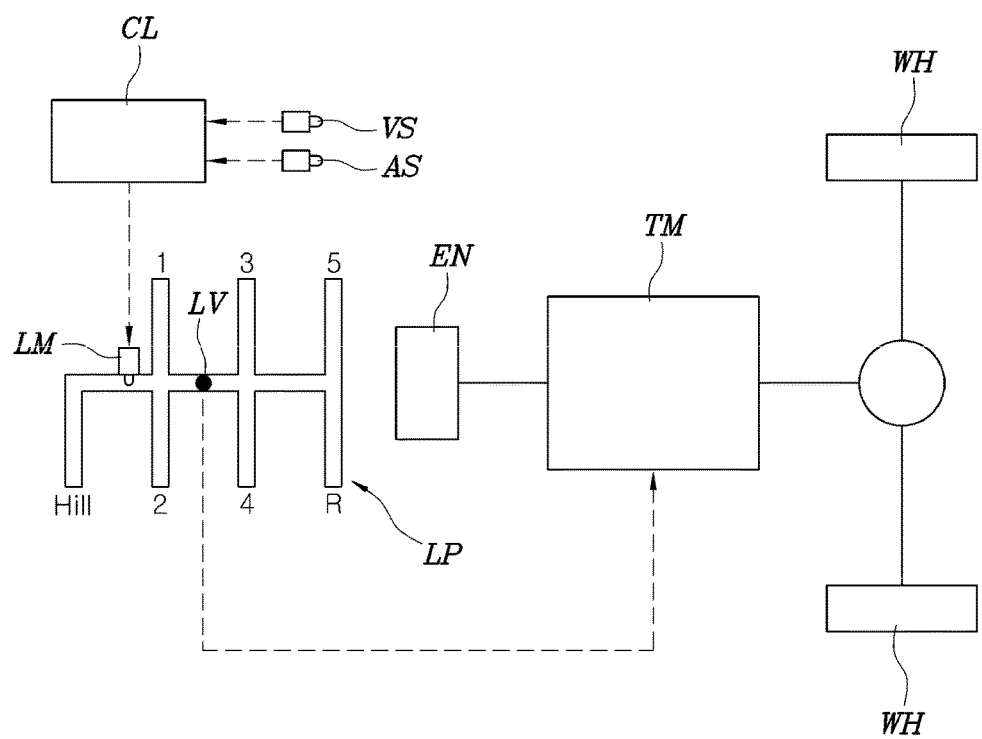
FIG. 3 is a drawing which illustrates a composition of the present disclosure.
Figure 4:
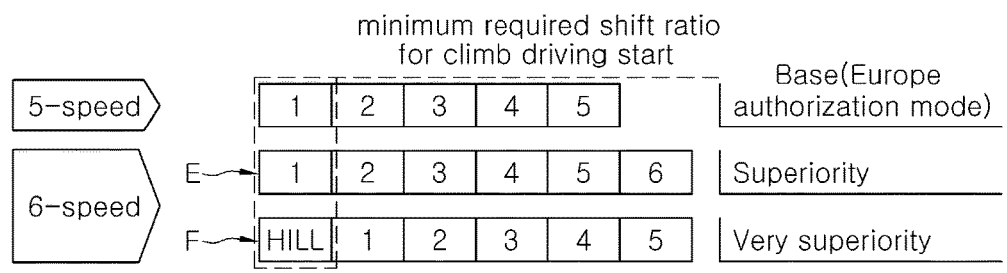
FIG. 4 is a drawing which illustrates arrangements of shift ratio span of 6 speeds transmission according to the present disclosure in comparison with a conventional art.
Figure 5:
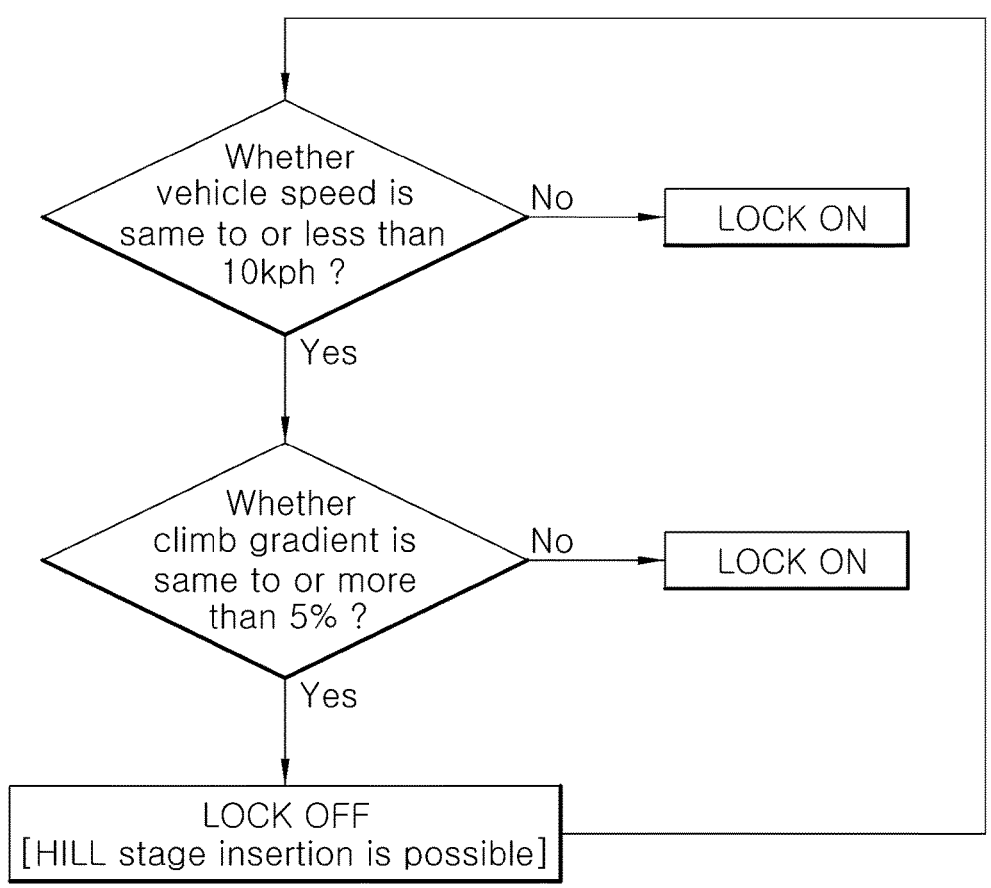
FIG. 5 is a flowchart which illustrates a control method for a shift limit means according to the present disclosure.

Referring to FIGS. 3 to 5, a shifting apparatus for a vehicle according to the present disclosure is a shifting apparatus for a vehicle which includes a transmission TM realizing series of multi shift stages so that a shift stage is sequentially more increased as a shift ratio is more decreased, and the shifting apparatus includes: a shift limit means LM which designates a lowest shift stage having a largest shift ratio to a shift stage for climbing and limiting so that it is possible that a driver selects the shift stage for climbing in an only case that a vehicle is satisfied to a predetermined climbing condition recognizing a climbing condition, a gradient angle sensor AS for measuring a climb gradient of a vehicle, a vehicle speed sensor VS for measuring a vehicle speed, and a controller CL which determines the climbing condition based on signals the gradient angle sensor AS and the vehicle speed sensor VS so as to control a shift limit means LM.

In FIG. 3, the power of an engine EN is transferred to a driving wheel WH through a transmission TM and handling shift lever LV by a driver is mechanically or electrically transferred to the transmission TM by a shift link, a wire, a cable, and so on such that it is possible for a desired shift stage to be selected.

In the depicted form, the shift limit means LM may be a solenoid actuator installed so as to block or release a route that a shift lever LV enters the shift stage for climbing among shift lever patterns LP which are moving routes of the shift lever LV.

That is, the solenoid actuator is mounted to be switched to a state of being protruded on the moving route of the shift lever LV and a state of being retreated depending on a control of the controller CL for limiting movement of the shift lever LV by being protruded on the moving route of the shift lever LV or releasing movement of the shift lever LV by being retreated.

Of course, the shift limit means LM may be configured so that a member such as a cam which is driven by a motor is protruded on the moving route of the shift lever LV or is retreated.

The controller CL is configured to control the solenoid actuator for limiting that the shift lever LV selects the shift stage for climbing in case that a vehicle speed being inputted from the vehicle speed sensor VS is same to or less than a predetermined standard vehicle speed and a climb gradient of a vehicle being inputted from the gradient angle sensor AS is same to or more than a predetermined standard angle.

That is, as shown in FIG. 5, it is permitted that a driver moves the shift lever LV to the shift stage for climbing in only case that a vehicle speed is same to or less than 10 kph and a climb gradient of a climb road is same to or more than a sloped angle of approximately 5%.

Herein, the standard vehicle speed may be predetermined to the above mentioned approximately 10 kph, but it is not limited thereto so that the standard vehicle speed may be predetermined based on a design by a plurality of experiment and analysis according to power performance of a vehicle, and the standard angle may be set to the above mentioned approximately 5%, but it is not limited thereto so that the standard angle may be predetermined based on a design by a plurality of experiment and analysis according to power performance of a vehicle.

The series of shift stages of the transmission TM except the shift stage for climbing sequentially form 1-stage to N-stage from a shift stage having a shift ratio to be closest to the shift stage for climbing. Herein, the N means a highest shift stage having a smallest shift ratio of the shift stages.

That is, as shown in FIG. 4, the transmission TM of the present disclosure may have sequentially 5 shift stages as shift ratios of entire advance shift stages except the shift stage for climbing having a largest shift ratio are decreased, and in this case, the N is to be 5-stage.

Figure 2:
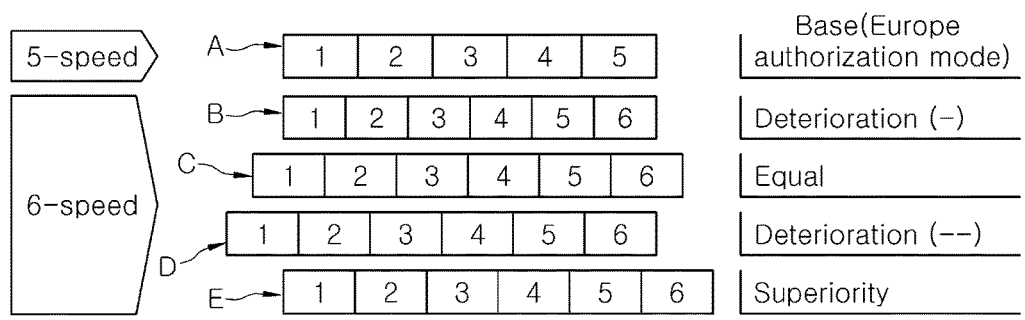
FIG. 2 is a drawing which compares relation of fuel efficiency about shift ratio span of various 6 speeds transmissions with respect to shift ratio span of a 5 speeds transmission according to Europe authorization mode.

Referring to FIG. 4, the present disclosure is configured so that fuel efficiency is more improved in comparison with E in FIG. 2, and the present disclosure, which is represented as "F", is evaluated with respect to fuel efficiency according to Europe authorization mode should be performed as 6 stages transmission TM having advance 6 speeds in a conventional case, but in case of the present disclosure, fuel efficiency is improved when fuel efficiency is measured according to Europe authorization mode as the shift stage for climbing (Hill-stage) has shift ratio span to be equal with a conventional 1-stage and 1 to 5-stages are sequentially arranged as next stages such that a vehicle can be driven by a relatively low shift ratio in an equal shift stage.

That is, the Hill-stage in the present disclosure should be regarded to 1-speed shift stage in a conventional shifting apparatus, but the Hill-stage is not regarded as a general advance shift stage while performing shift as the Hill-stage is restrictedly selected by the shift limit means LM so as to be only selected on the predetermined climbing condition and then it is possible that a vehicle is driven as relatively low shift ratio during evaluating according to Europe authorization mode as other shift stages are sequentially regarded to relatively low shift stages.

In the present exemplary form, each shift ratio span of the 1-stage to the N-stage is adapted to be equal with shift ratio span of the manual transmission TM according to Europe authorization mode.

That is, width of shift ratio in which the each shift stages occupy is configured to have an equal level with it which is required according to conventional Europe authorization mode.

Meanwhile, in the present exemplary form, as shown in FIG. 4, the shift ratio of the Hill-stage is predetermined to be equal to the shift ratio of 1-speed shift stage which is a lowest shift stage of advance shift stages according to Europe authorization mode, but the shift ratio of the Hill-stage may be predetermined to be larger than the shift ratio of 1-speed shift stage which is a lowest shift stage of advance shift stages according to Europe authorization mode.

In case that the shift ratio of the Hill-stage is to be larger than the shift ratio of 1-speed shift stage according to Europe authorization mode, it is possible to provide sufficient grade ability for inhibiting or preventing that output of an engine EN is deteriorated by recent engine EN downsizing.

Of course, case that the shift ratio of the Hill-stage is predetermined to be larger than the shift ratio of 1-speed shift stage according to Europe authorization mode, it may be desirable to condignly maintain span of each shift stages as the shift ratios of shift stages to be more than the Hill-stage are predetermined to be larger as a little such that rhythm of sequential shifting is provided.

Even this case, effect improving fuel efficiency according to Europe authorization mode as 6 speed shift stages, which has many shift stages in comparison with 5 speed shift stages, is provided required in Europe authorization mode if the Hill-stage is included, and resultantly, a highest shift stage can be driven by lower shift stage.

As result, the present disclosure is provided to gain better evaluation result in Europe authorization mode with respect to a 6 stages manual transmission TM.

Although the forms of the present disclosure have been disclosed for illustrative purposes, those skilled in the art will appreciate that various modifications, additions and substitutions are possible, without departing from the scope and spirit of the present disclosure as disclosed in the present disclosure.

What is claimed is:

1. A shifting apparatus for a vehicle which includes a transmission realizing a plurality of shift stages, the shifting apparatus comprising:
   a shift limit device configured to designate a lowest shift stage of the plurality of shift stages as a climbing shift stage having a largest shift ratio for climbing and to limit a driver to select the climbing shift stage in an only case that a vehicle satisfies a predetermined climbing condition;
   a gradient angle sensor configured to measure a climb gradient of the vehicle;
   a vehicle speed sensor configured to measure a vehicle speed; and
   a controller configured to determine whether the predetermined climbing condition is satisfied based on signals of the gradient angle sensor and the vehicle speed sensor and to control the shift limit device.

2. The shifting apparatus of claim 1, wherein the shift limit device is a solenoid actuator configured to block or release a route that a shift lever enters the climbing shift stage for climbing in shift lever patterns which are moving routes of the shift lever.

3. The shifting apparatus of claim 2, wherein the controller is configured to control the solenoid actuator for limiting that the shift lever selects the climbing shift stage for climbing in case that the vehicle speed being inputted from the vehicle speed sensor is same to or less than a predetermined standard vehicle speed, and the climb gradient of the vehicle being inputted from the gradient angle sensor is same to or more than a predetermined standard angle.

4. The shifting apparatus of claim 1, wherein the plurality of shift stages of the transmission except the climbing shift stage sequentially form 1-stage to N-stage from a shift stage having a shift ratio to be closest to the climbing shift stage, where the N-stage means a highest shift stage having a smallest shift ratio among the plurality of shift stages.

* * * * *